United States Patent [19]

Scharrer et al.

[11] Patent Number: 5,017,023

[45] Date of Patent: May 21, 1991

[54] ASYMMETRICALLY STEPPED HYDROSTATIC BEARING

[75] Inventors: Joseph K. Scharrer, Newbury Park; Robert F. Beatty, West Hills; Arpad Csomor, Westlake Village, all of Calif.

[73] Assignee: Rockwell International Corporation, El Segundo, Calif.

[21] Appl. No.: 528,406

[22] Filed: May 24, 1990

[51] Int. Cl.$^5$ ............................................. F16C 32/06
[52] U.S. Cl. ..................................... 384/114; 384/118
[58] Field of Search .................................. 384/100–102, 384/106, 114, 118–120

[56] References Cited

U.S. PATENT DOCUMENTS 2,879,111  3/1959  Heinrich et al. .................... 384/114
3,374,039  3/1968  Voorhies ............................. 384/114

Primary Examiner—Thomas R. Hannon
Attorney, Agent, or Firm—H. Fredrick Hamann; Harry B. Field; Steve E. Kahm

[57] ABSTRACT

To decrease the wear between the journal 6, and the hydrostatic bearing 1, especially during start up and shut down of the turbomachine, a rub ring 5, is employed intermediate the journal and bearing. The rub ring will come into contact with the journal before the bearing and prevent contact with the bearing bore. The rub ring also serves to block the leakage of the fluid from the bearing. This interrupted flow causes an increase in the stiffness and damping coefficients of the hydrostatic bearing. The use of the rub ring increases the life of the bearing, improves the rotordynamic performance, reduces the leakage flow and improves the hydrodynamic performance of the hydrostatic bearing.

12 Claims, 1 Drawing Sheet

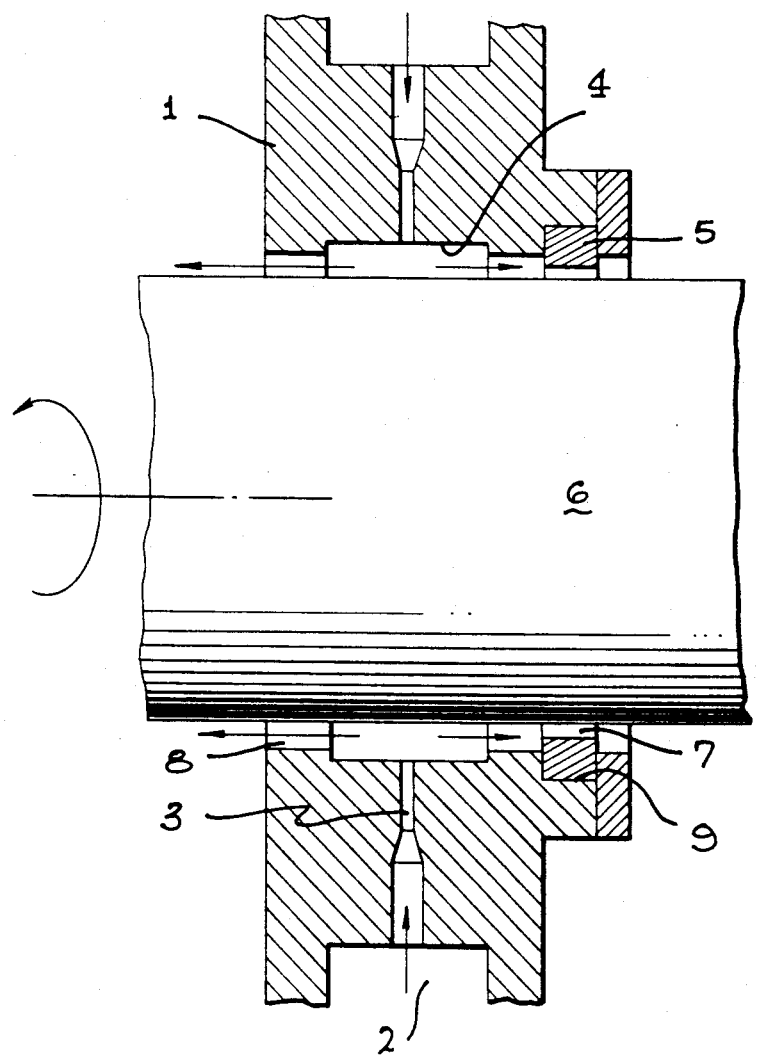

ASYMMETRICALLY STEPPED HYDROSTATIC BEARING

BACKGROUND OF THE INVENTION

In turbomachinery using hydrostatic bearings there is a potential for wear on the bearing bore and journal due to contact between the two during start up and shut down. This wear is undesirable as it deteriorates the hydrostatic bearing performance. If this wear becomes excessive the hydrostatic bearing will not function efficiently and this will have a deleterious effect on the turbomachine.

It has long been a goal in the hydrostatic bearing industry to reduce wear and to make improvements which increase the stiffness and damping coefficients of hydrostatic bearings for improved rotordynamic response and to reduce leakage flow and thereby improve hydrodynamic performance.

SUMMARY OF THE INVENTION

The invention employs a rub ring attached to a hydrostatic bearing which will come in rubbing contact with the journal principally during start up and shut down to prevent contact between the journal and bearing. The rub ring will thus prevent wear of the bearing and journal and increase the performance and longevity of the bearing.

The rub ring has a smaller clearance relative to the journal and thus restricts leakage. This configuration also results in increased stiffness and damping coefficients of the bearing.

BRIEF DESCRIPTION OF THE DRAWINGS

FIG. 1 is a side view of the Asymmetrically Stepped Hydrostatic Bearing.

DETAILED DESCRIPTION OF THE PREFERRED EMBODIMENT

Referring to FIG. 1 there is shown an asymmetrically stepped hydrostatic bearing shown generally as 1 and a journal 6. The typical hydrostatic bearing has a manifold 2, a restrictor 3, a recess 4 and a clearance B between the journal and the bearing. The clearance must be large enough to allow the journal to spin freely so as not to come in rubbing contact with the bearing and yet small enough to have a low leakage rate and an effective stiffness to hold the rotor in place by being suspended on a fluid film.

The typical hydrostatic bearing suffers from several drawbacks; one of which is the excessive wear caused by the journal 6 coming into contact with the bearing 1 particularly during start up and shut down of a turbomachine. To help solve this problem a rub ring 5, may be added to the bearing. The rub ring should extend intermediate the bearing and the journal so the journal will come into rubbing contact with the rub ring and not the bearing, thus saving wear on the bearing.

Use of the rub ring greatly increases the life of the bearing by reducing wear. A worn bearing may lead to critical speed amplification, and rotordynamic instabilities which impair the performance of a turbomachine and limit its service life. Therefore use of a rub ring also increases the service life of a turbomachine.

The rub ring 5, also benefits the bearing by having a smaller clearance 7, which lowers the leak rate on that side of the bearing, thus using less fluid. These conditions are beneficial to the bearing causing increased stiffness and increased damping. The results are improved rotordynamic response and improved hydrodynamic performance.

The turbomachine application defined by the Applicants was for use in a rocket engine having an unlubricated cryogenic environment. For this use a rub ring made of a carbon composite which is self lubricating and wear resistant was employed. It is important to make sure that the rub ring is securely attached in a slot 9, on the bearing so that there are no secondary fluid leaks around the rub ring. An advantage of the rub ring at the end of the bearing is that it can be replaced easily if wear becomes excessive.

In the asymmetrically stepped hydrostatic bearing example as designed there was a 3 inch diameter bearing 1.65 inches in length. The optimum radial clearance of the rub ring relative to the bearing is design dependent. As presented in our analysis the stiffness of the hydrostatic bearing using a rub ring was about equal to the bearing without a rub ring when the rub ring had a clearance of 0.00075 inches. As the rub ring clearance is increased, the stiffness improves until the rub ring clearance reaches 0.0025 inches. Then the clearance became too large and the stiffness began to decrease. If the rub ring clearance were to be increased to the clearance of the bearing, the stiffness would be at least as great as if no rub ring were added. If the clearance between the rub ring and the journal was less than 0.00075 inches the stiffness is decreased over the bearing without the rub ring.

Analyses for cross coupled stiffness were conducted with clearances between the journal and the rub ring of between 0.0005 and 0.0025 inches. The cross coupled stiffness increased by using a rub ring for all clearances between the journal and the rub ring. However the cross coupled stiffness decreased as the clearance increased.

The direct damping of the hydrostatic bearing with the rub ring increased over the use of just a hydrostatic bearing substantially when radial clearances were 0.0005 and decreased as the radial clearances increased to 0.0025.

The relative importance of the increased cross-coupled stiffness and direct damping can be expressed by the whirl frequency ratio. The whirl frequency ratio is the ratio of the destabilizing influence of the cross-coupled stiffness to the stabilizing influence of damping. The analyses showed that the whirl frequency ratio was lower for all gap distances evaluated, thus showing that a hydrostatic bearing with a rub ring is superior to a hydrostatic bearing without a rub ring.

There are several variables which effect the performance of the hydrostatic bearing with a rub ring. Among these factors are the length of the rub ring 5, the distance of the rub ring from the recess 4, and the clearance 7, between the journal and the rub ring. Changes in these factors for different fluids at different temperatures, different shaft speeds, journal diameters and bearing lengths will effect the optimum designs for hydrostatic bearings with rub rings, however it has been shown that the use of a rub ring will improve the performance of a hydrostatic bearing.

Further analyses have shown that two rub rings one on either side of the recess decreases the effectiveness of the rub ring dramatically for stiffness. Other analyses suggest that the distance of the rub ring from the recess can be changed to maximize the effectiveness of the rub ring.

What is claimed is:

1. An asymmetrically stepped hydrostatic bearing comprising:
    a journal in close proximity to a hydrostatic bearing having a manifold for introducing a fluid into a recess between the journal and the bearing,
    a small clearance between the bearing and the journal extending axially in both directions from the recess for the fluid to flow out from the recess along the journal wall,
    a rub ring extending radially intermediate the bearing and the journal to partially block the fluid flow in one direction resulting in increased stiffness and damping of the bearing and decreasing the fluid leak rate during high speed operation,
    the rub ring also preventing contact between the journal and the bearing during low speed operation.

2. An asymmetrically stepped hydrostatic bearing as in claim 1 where the rub ring is placed on one side of the hydrostatic bearing at a distance from a recess in the hydrostatic bearing so as to maximize the performance of the hydrostatic bearing.

3. An asymmetrically stepped hydrostatic bearing as in claim 2 where the rub ring has a length which is selected to maximize the performance of the hydrostatic bearing.

4. An asymmetrically stepped hydrostatic bearing as in claim 3 where the clearance between the journal and the rub ring is selected to maximize the performance of the hydrostatic bearing.

5. An asymmetrically stepped hydrostatic bearing as in claim 4 where the rub ring is made of a wear resistant material.

6. An asymmetrically stepped hydrostatic bearing as in claim 5 where the rub ring is secured to the hydrostatic bearing in an annual slit therefore and is securely held to prevent secondary leaks.

7. An asymmetrically stepped hydrostatic bearing as in claim 6 wherein the rub ring is positioned relative to the hydrostatic bearing such that it can be easily changed.

8. An asymmetrically stepped hydrostatic bearing as in claim 1 where the rub ring has a length which is selected to maximize the performance of the hydrostatic bearing.

9. An asymmetrically stepped hydrostatic bearing as in claim 1 where the clearance between the journal and the rub ring is selected to maximize the performance of the hydrostatic bearing.

10. An asymmetrically stepped hydrostatic bearing as in claim 1 where the rub ring is made of a wear resistant material.

11. An asymmetrically stepped hydrostatic bearing as in claim 1 where the rub ring is secured to the hydrostatic bearing in an annual slit therefore and is securely held to prevent secondary leaks.

12. An asymmetrically stepped hydrostatic bearing as in claim 1 where the rub ring is positioned relative to the hydrostatic bearing such that it can be easily changed.

* * * * *